(12) United States Patent
Hamano et al.

(10) Patent No.: US 10,783,264 B2
(45) Date of Patent: Sep. 22, 2020

(54) NON-TRANSITORY COMPUTER-READABLE STORAGE MEDIUM, AND INFORMATION PROCESSING DEVICE USING UNIQUE FILE-SPECIFIC INFORMATION FOR DECRYPTION OF A TARGET FILE

(71) Applicant: FUJITSU LIMITED, Kawasaki-shi, Kanagawa (JP)

(72) Inventors: Takanori Hamano, Yokohama (JP); Seiji Kurimoto, Yokohama (JP); Yumiko Yamagata, Kawasaki (JP); Yoko Miura, Kawasaki (JP); Yoshimi Yufu, Narita (JP); Satoshi Wakabayashi, Yokohama (JP); Yoriko Yamada, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 15/692,016

(22) Filed: Aug. 31, 2017

(65) Prior Publication Data
US 2018/0068127 A1    Mar. 8, 2018

(30) Foreign Application Priority Data
Sep. 6, 2016    (JP) .................................. 2016-174078

(51) Int. Cl.
*G06F 21/62*    (2013.01)
*G06F 21/10*    (2013.01)
*H04L 29/06*    (2006.01)

(52) U.S. Cl.
CPC .......... *G06F 21/6218* (2013.01); *G06F 21/10* (2013.01); *G06F 2221/033* (2013.01);
(Continued)

(58) Field of Classification Search
CPC ................. G06F 21/6218; G06F 21/10; G06F 2221/2103; G06F 2221/033; G06F 2221/2107; H04L 63/0428
See application file for complete search history.

(56) References Cited

U.S. PATENT DOCUMENTS 9,177,160 B1 *    11/2015    Farquhar ............. H04L 63/0853
2006/0020578 A1 *    1/2006    Hood .................... G06F 9/4493
(Continued)

FOREIGN PATENT DOCUMENTS

JP    2009-146067 A    7/2009
JP    2015-45956 A    3/2015
(Continued)

*Primary Examiner* — Carl G Colin
*Assistant Examiner* — Han Yang
(74) *Attorney, Agent, or Firm* — Westerman, Hattori, Daniels & Adrian

(57) ABSTRACT

A non-transitory computer-readable storage medium storing a control program that causes a computer to execute a process including receiving specified information generated in response to reception of an acquisition request of data from a terminal device that decrypts an encrypted data corresponding to the data, and identification information on the terminal device, determining whether or not the specified information is stored, in a storage unit, in association with the received identification information on the terminal device that has sent the acquisition request, the storage unit storing the specified information to be generated in association with the identification information on a terminal device for which a data acquisition is permitted for each of the plurality of pieces of data, and transmitting information that permits decryption of the encrypted data corresponding to the data to the terminal device when the specified information is stored in association with the received identification information.

9 Claims, 16 Drawing Sheets

(52) U.S. Cl.
CPC ............... *G06F 2221/2103* (2013.01); *G06F 2221/2107* (2013.01); *H04L 63/0428* (2013.01)

(56) References Cited

U.S. PATENT DOCUMENTS

| | | | |
|---|---|---|---|
| 2006/0075228 A1* | 4/2006 | Black | H04L 63/0428 713/167 |
| 2012/0166524 A1* | 6/2012 | Watakabe | G06F 12/1416 709/203 |
| 2015/0066924 A1 | 3/2015 | Morimoto | |
| 2016/0219047 A1* | 7/2016 | Jayaraman | A61B 5/04842 |

FOREIGN PATENT DOCUMENTS

| | | |
|---|---|---|
| JP | 2015-46781 A | 3/2015 |
| WO | 2006/022011 A1 | 3/2006 |

* cited by examiner

FIG. 9A
```
TAKE-OUT PRE-REQUEST SCREEN                            ×
⬅ ➡  http://192.***.***.***/                          — Bx6
FILE (F)  EDIT (E)  VIEW (V)
       PLEASE ENTER FOLLOWING FILEDS AND
            CLICK REQUEST BUTTON
   TAKE-OUT DATE                  2016/08/02         — Bx1
   NAME OF PERSON                  Fuji Taro         — Bx2
   WHO TAKES OUT
   MAC ADDRESS OF                :::::   — Bx3
   DECRYPTION TERMINAL
   EXPIRATION DATE                 2016/08/16        — Bx4
   FILE NAME AND FOLDER NAME       C:¥XYZ.doc        — Bx5
   OF TARGET FILE
                     REQUEST BUTTON
                                            ↖ Pt
                     Bt1
```
FIG. 9B
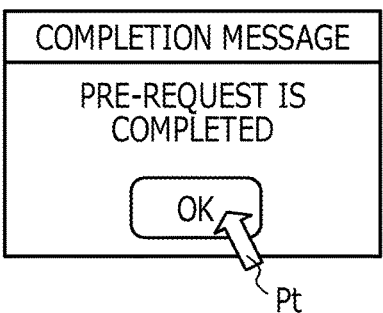
FIG. 9C
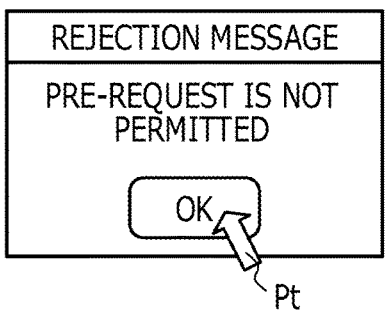

FIG. 16A

| OPERATION LOG RECODED BY FILE OPERATION | GENERATE TARGET FILE<br>↓<br>UPDATE<br>XYZ.doc | REPLICATE FROM SHARED SERVER<br>↓<br>UPDATE<br>XYZ.doc | TARGET FILE GENERATION<br>↓<br>UPDATE<br>PQR.doc |
|---|---|---|---|
| OPERATION LOG RECODED BY TAKE-OUT OPERATION (NAME OF ENCRYPTED FILE & GENERATION DATE AND TIME) | ABC.exe<br>2019/3/20 11:32 | ABC.exe<br>2019/3/20 11:40 | ABC.exe<br>2019/3/20 11:43 |

TAKE-OUT

| DECRYPT IN DECRYPTION TERMINAL | DETERMINE ORIGINAL TARGET FILE FROM GENERATION DATE AND TIME OF ABC.exe<br>⇒ GENERATION DATE AND TIME MAY BE CHANGED BY OS FUNCTION |
|---|---|

FIG. 16B

| OPERATION LOG RECODED BY FILE OPERATION | GENERATE TARGET FILE<br>↓<br>UPDATE<br>XYZ.doc | REPLICATE FROM SHARED SERVER<br>↓<br>UPDATE<br>XYZ.doc | GENERATE TARGET FILE<br>↓<br>UPDATE<br>PQR.doc |
|---|---|---|---|
| OPERATION LOG RECODED BY TAKE-OUT OPERATION (NAME OF ENCRYPTED FILE & FILE-SPECIFIC INFORMATION) | ABC.exe<br>1603201132A8ty | ABC.exe<br>1603201140k33r | ABC.exe<br>1603201143ywbc |

TAKE-OUT

| DECRYPT IN DECRYPTION TERMINAL | DETERMINE ORIGINAL TARGET FILE FROM FILE-SPECIFIC INFORMATION<br>⇒ FILE-SPECIFIC INFORMATION MAY NOT BE CHANGED BY OS FUNCTION |
|---|---|

NON-TRANSITORY COMPUTER-READABLE STORAGE MEDIUM, AND INFORMATION PROCESSING DEVICE USING UNIQUE FILE-SPECIFIC INFORMATION FOR DECRYPTION OF A TARGET FILE

CROSS-REFERENCE TO RELATED APPLICATION

This application is based upon and claims the benefit of priority of the prior Japanese Patent Application No. 2016-174078, filed on Sep. 6, 2016, the entire contents of which are incorporated herein by reference.

FIELD

The embodiment discussed here is related to a non-transitory computer-readable storage medium, and an information processing device.

BACKGROUND

There is known a technique for avoiding leakage of information stored in a client device (hereinafter, referred to as a terminal device) such as a personal computer (PC). For example, a technique for improving security against leakage of information is known by using the file name identifying the file from another file and a media access control (MAC) address of the terminal device when decrypting an encrypted file, is known (for example, refer to Japanese Laid-open Patent Publication No. 2009-146067).

On the other hand, in order to use the information stored in the terminal device of a company at a place to which an employee goes out, it is also known to store certain information in a portable Universal Serial Bus (USB) memory before going out and to take out the information when going out (for example, refer to Japanese Laid-open Patent Publication No. 2015-046781).

SUMMARY

According to an aspect of the invention, a non-transitory computer-readable storage medium storing a control program that causes a computer to execute a process, the process including receiving specified information generated in response to reception of an acquisition request of data from a terminal device that decrypts an encrypted data corresponding to the data, and identification information on the terminal device, determining whether or not the specified information is stored, in a storage unit, in association with the received identification information on the terminal device that has sent the acquisition request, the storage unit storing the specified information to be generated in response to reception of a take-out operation of the data in association with the identification information on a terminal device for which a data acquisition is permitted for each of the plurality of pieces of data, and transmitting information that permits decryption of the encrypted data corresponding to the data to the terminal device when the specified information is stored in a storage unit in association with the received identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A to 9C are examples of a take-out pre-request screen;

FIGS. 16A and 16B are diagrams for explaining a specific example of a target file by file-specific information.

DESCRIPTION OF EMBODIMENT

By the way, if files which are different from each other are encrypted, the same file name is given to the encrypted files, and the encrypted files are taken out, there is a possibility that the encrypted files are decrypted by the above-described technique. For example, when a specific file name is given to the encrypted file and the encrypted file is decrypted by a terminal device at a place to which the encrypted file is taken out, a file name given to the file before being encrypted appears.

Thereafter, when the same file name as the specific file name is given to another encrypted file and the file is decrypted by the same terminal device, even though the file is a different file, the different file is decrypted by the same file name given as the specific file name. In this way, when files which are different from each other are encrypted, the same file name is given to the encrypted files, which are taken out, there is a concern that information will be leaked from the files that are taken out.

Therefore, an object in one aspect is to provide a control program and a decryption program capable of suppressing leakage of information from a file that is taken out.

Hereinafter, an embodiment of the present disclosure will be described with reference to the drawings.

Figure 1:
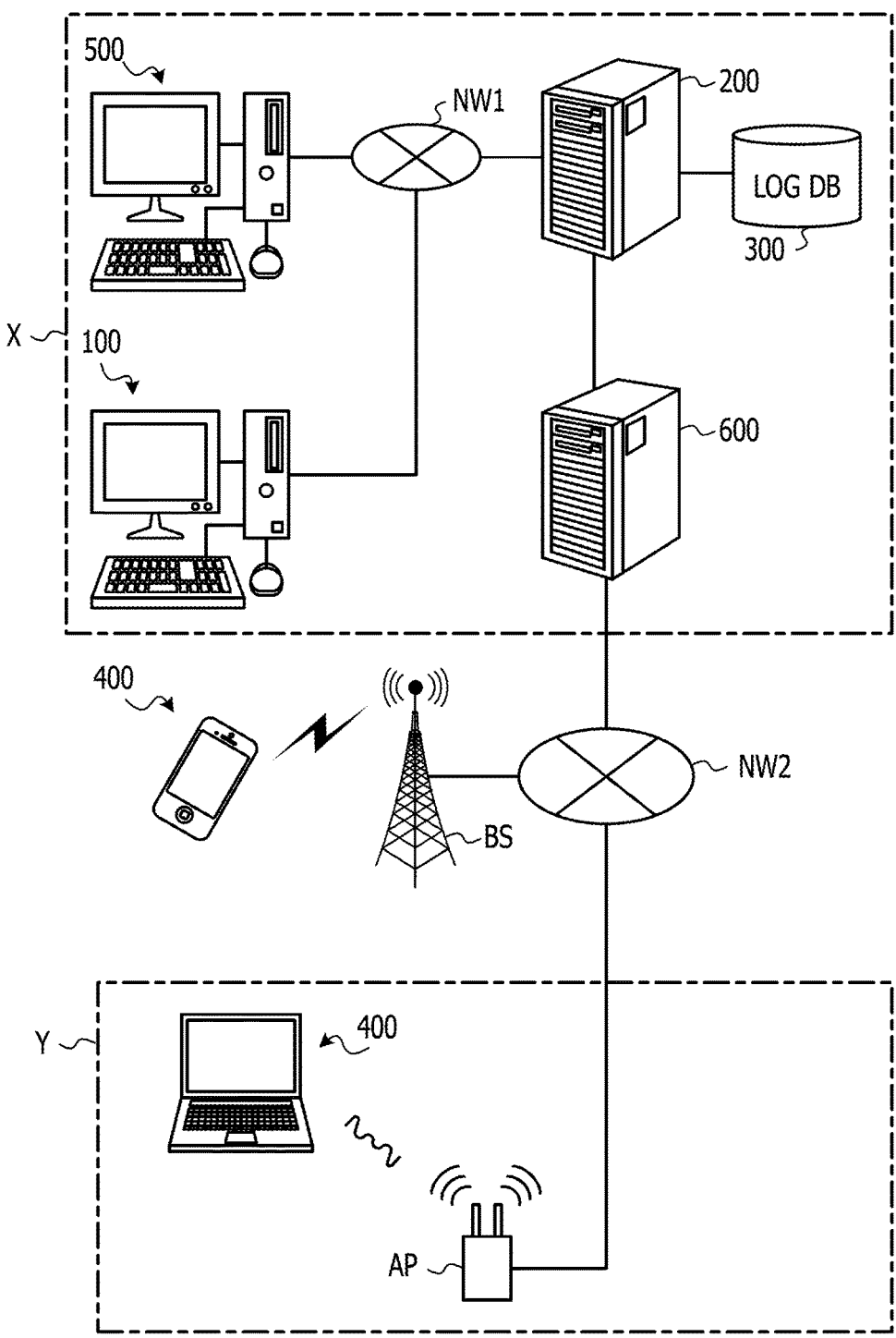
FIG. 1 is a diagram illustrating an example of an information processing system.

FIG. 1 is a diagram illustrating an example of an information processing system S. The information processing system S includes an encryption terminal 100, a management server 200 as an information processing device, a log DB 300, and a decryption terminal 400. A management terminal 500 and the gateway server 600 may or may not be included in the components of the information processing system S. In FIG. 1, the log DB 300 is illustrated as a separate entity of the management server 200, but the log DB 300 may be included within the management server 200.

As the encryption terminal 100 and the management terminal 500, for example, there is a stationary (desktop type) PC. As the management server 200, the log DB 300, and a gateway server 600, for example, there is a server device. As the decryption terminal 400, there are, for example, a portable type (mobile type) PC and a smart device. As the smart device, there is, for example, a smartphone or a tablet terminal.

Here, the encryption terminal 100, the management server 200, the log DB 300, the management terminal 500, and the gateway server 600 are placed in a base X. As the base X, there is, for example, a company or a school. The encryption terminal 100, the management server 200, and the management terminal 500 are connected to each other via a communication network NW1. As the communication network NW 1, there is, for example, local area network (LAN). Further, the management server 200 is also connected to the log DB 300 and the gateway server 600. The gateway server 600 is connected to a communication network NW 2. As the communication network NW2, there is, for example, the Internet.

On the other hand, the decryption terminal 400 is placed at a base Y that is physically separated from the base X, is placed at a place physically separated from the base X and the base Y. As the base Y, there is, for example, home or a business partner of a company. On the other hand, as a place other than the base X and the base Y, there are, for example, public facilities such as a station, an airport, and a park. The decryption terminal 400 placed in the base Y connects to an access point AP using a first wireless communication method. As the first wireless communication method, for example, Wi-Fi (registered trademark) is available. The decryption terminal 400 located at a location other than the base X and the base Y connects to a portable base station BS by using a second wireless communication method. As the second wireless communication method, for example, Long Term Evolution (LTE) is available. The access point AP and the portable base station BS are connected to the above-described communication network NW 2, respectively.

The encryption terminal 100 generates a target file to be encrypted (hereinafter, referred to as a "target file") according to an operation of a user, and obtains the target file from a shared server (not illustrated). As the target file, there are, for example, various electronic files such as a document file, an audio file, and an image file. Then, each time the encryption terminal 100 detects an operation of taking out the target file, the encryption terminal 100 encrypts the target file and generates an encrypted file. On the other hand, the decryption terminal 400 decrypts the encrypted file according to an operation of the user. For example, the decryption terminal 400 decrypts an encrypted file taken out from the base X to the base Y or a location other than the base Y.

The management server 200 manages the encryption terminal 100 and the decryption terminal 400. More specifically, the management server 200 monitors the encryption terminal 100 and the decryption terminal 400 and records a log (for example, a log for a file operation) of operations performed in the encryption terminal 100 and the decryption terminal 400 in time series in the log DB 300. For example, the management terminal 500 obtains the content of the operation performed in the encryption terminal 100 via the communication network NW 1 and records the contents of the operation in the log DB 300 as a log. For example, the management terminal 500 obtains the content of the operation performed in the decryption terminal 400 via the communication network NW 2 and records the contents of the operation in the log DB 300 as a log. At this time, the gateway server 600 obtains the content of the operation performed in the decryption terminal 400 and relays the content to the management terminal 500. The management terminal 500 may access the management server 200 and obtain the log stored in the log DB 300. Therefore, a system administrator operating the management terminal 500 may trace back various operations performed on the file by checking the obtained log.

Next, the hardware configuration of the management server 200 will be described with reference to FIG. 2. Since the above-described encryption terminal 100, the log DB 300, the management terminal 500, and the gateway server 600 have basically the same hardware configuration as that of the management server 200, description thereof will be omitted.

Figure 2:
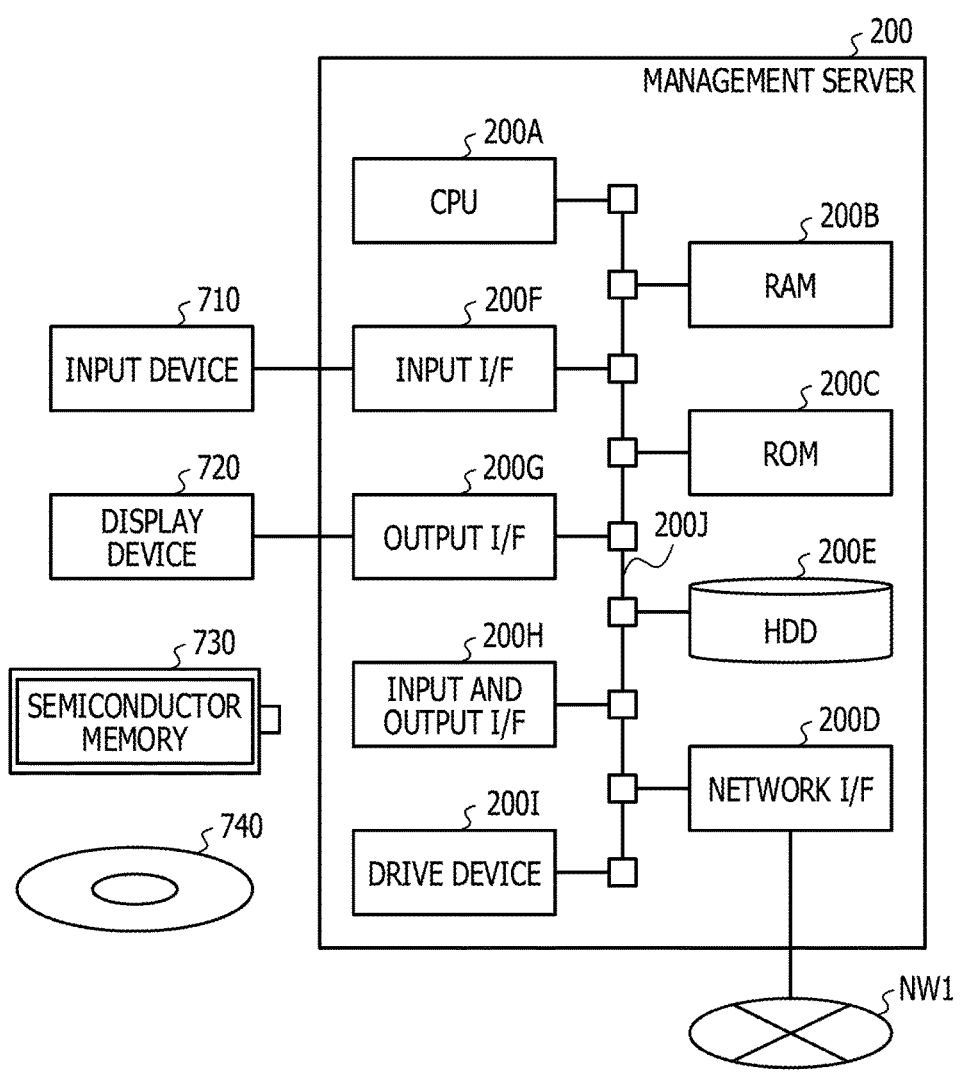
FIG. 2 is an example of a hardware configuration of a management server.

FIG. 2 is an example of a hardware configuration of a management server 200. As illustrated in FIG. 2, the management server 200 includes at least a central processing unit (CPU) 200A, a random access memory (RAM) 200B, a read only memory (ROM) 200C, and a network I/F (interface) 200D. The management server 200 may include at least one of a hard disk drive (HDD) 200E, an input I/F 200F, an output I/F 200G, an input and output I/F 200H, and a drive device 200I according to conditions. The CPU 200A and the drive device 200I are connected to each other by an internal bus 200J. At least the CPU 200A and the RAM 200B cooperate to realize a computer.

An input device 710 is connected to the input I/F 200F. As the input device 710, there are, for example, a keyboard, a mouse, and the like.

A display device 720 is connected to the output I/F 200G. As the display device 720, there is, for example, a liquid crystal display.

A semiconductor memory 730 is connected to the input and output I/F 200H. As the semiconductor memory 730, there is, for example, a USB memory or flash memory. The input and output I/F 200H reads programs and data stored in the semiconductor memory 730.

The input I/F 200F and the input and output I/F 200H have, for example, USB ports. The output I/F 200G has, for example, a display port.

In the drive device 200I, a portable recording medium 740 is inserted. As the portable recording medium 740, there is, for example, a removable disk such as a compact disc (CD)-ROM and a digital versatile disc (DVD). The drive device 200I reads the program and data recorded in the portable recording medium 740.

A network I/F 200D has, for example, a LAN port. In addition to the communication network NW 1, the network I/F 200D is also connected to the log DB 300 and the gateway server 600.

In the above-described RAM 200B, the program stored in the ROM 200C or the HDD 200E is stored by the CPU 200A. In the RAM 200B, the program recorded in the portable recording medium 740 is stored by the CPU 200A. By executing the stored program by the CPU 200A, various functions to be described later are realized, and further, various processes to be described later are executed. The program may be in accordance with a flowchart to be described later.

Next, the hardware configuration of the decryption terminal 400 will be described with reference to FIG. 3.

Figure 3:
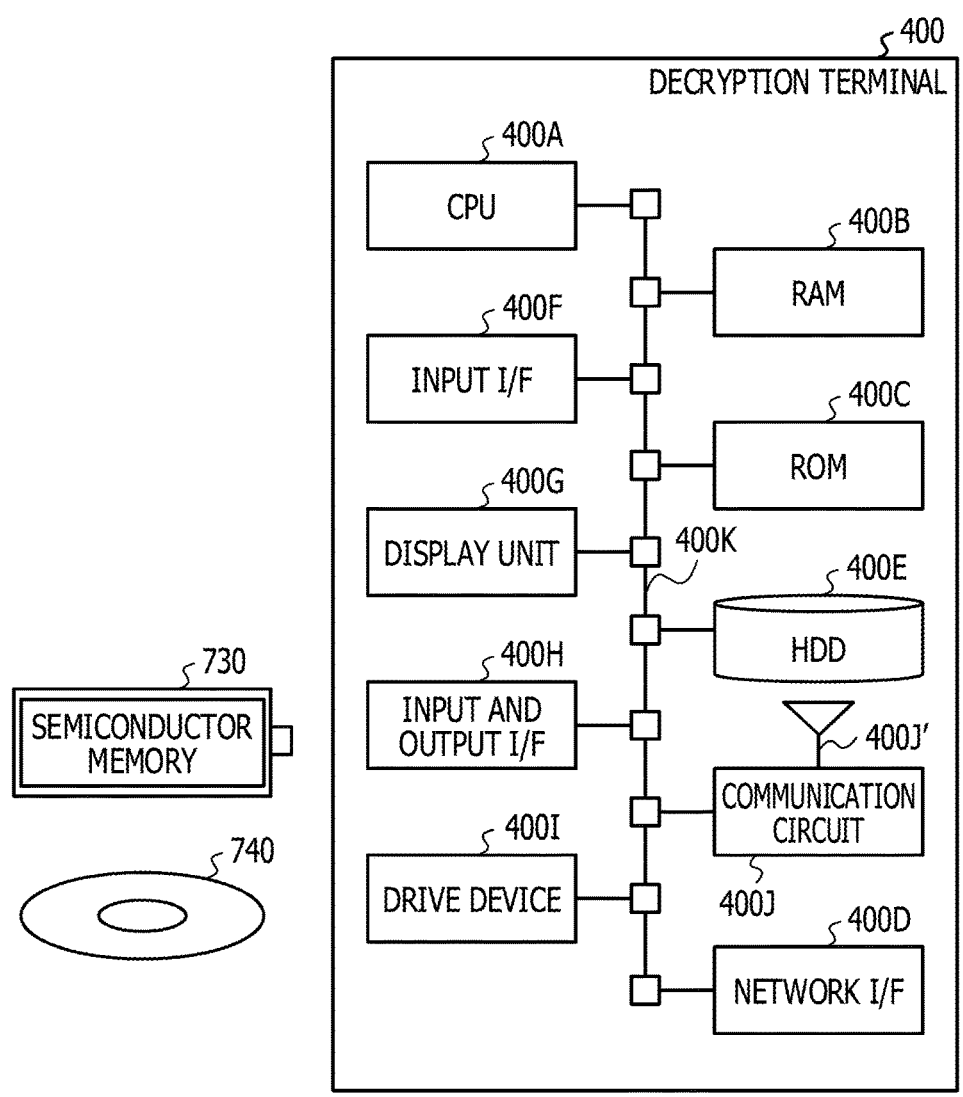
FIG. 3 is an example of a hardware configuration of a decryption terminal.

FIG. 3 is an example of a hardware configuration of the decryption terminal 400. As illustrated in FIG. 3, the decryption terminal 400 includes at least a CPU 400A, a RAM 400B, a ROM 400C, and a network I/F 400D. Further, the decryption terminal 400 also includes an input unit 400F and a display unit 400G. As the input unit 400F, there are, for example, a keyboard, a pointing device, and a touch panel. As the display unit 400G, there is, for example, a liquid crystal display.

Further, the decryption terminal 400 may include at least one of an HDD 400E, an input and output I/F 400H, a drive device 400I, and a communication circuit 400J according to conditions. The CPU 400A and the communication circuit 400J are connected to each other by an internal bus 400K. At least the CPU 400A and the RAM 400B cooperate to realize a computer.

The above-described semiconductor memory 730 is connected to the input and output I/F 400H. The input and output I/F 400H reads programs and data stored in the semiconductor memory 730. The input and output I/F 400H has, for example, a USB port.

In the drive device 400I, the above-described portable recording medium 740 is inserted. The drive device 400I reads the program and data recorded in the portable recording medium 740.

An antenna 400J' is connected to the communication circuit 400J. Instead of the communication circuit 400J, a CPU that realizes a communication function may be used. The network I/F 400D has, for example, a local area network (LAN) port.

In the above-described RAM 400B, the program stored in the HDD 400E or the semiconductor memory 730 is stored by a CPU 400A. Further, in the RAM 400B, the program recorded in the portable recording medium 740 is stored by the CPU 400A. By executing the stored program by the CPU 400A, various functions to be described later are realized, and further, various kinds of operations to be described later are executed. The program may be in accordance with a flowchart to be described later.

Next, the function of the encryption terminal 100 will be described with reference to FIG. 4.

Figure 4:
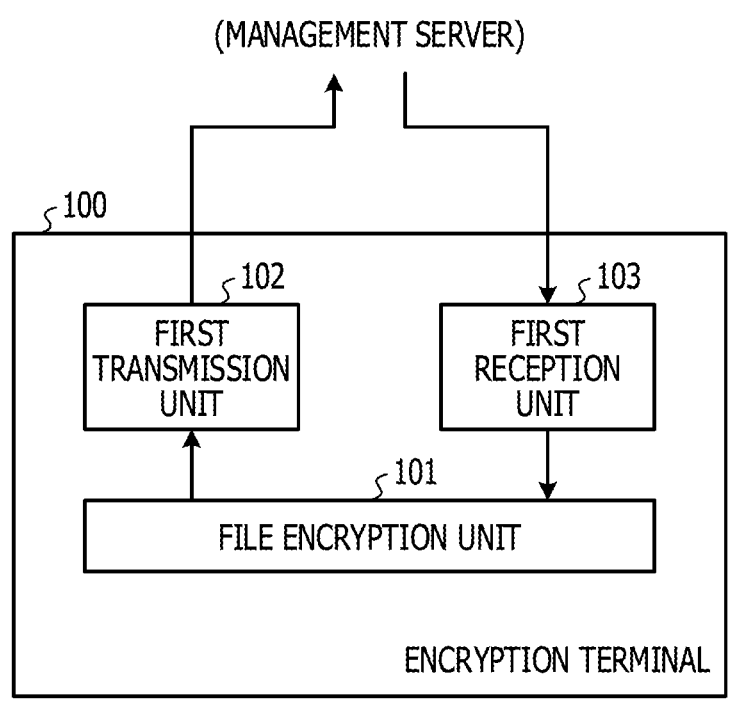
FIG. 4 is an example of a functional block diagram of an encryption terminal.

FIG. 4 is an example of a functional block diagram of the encryption terminal 100. The encryption terminal 100 includes a file encryption unit 101, a first transmission unit 102, and a first reception unit 103.

The file encryption unit 101 encrypts a target file. More specifically, the file encryption unit 101 encrypts the target file together with the file-specific information using an encryption program installed in the encryption terminal 100 and generates an encrypted file. The encrypted file is an encrypted target file. On the other hand, the file-specific information is information uniquely specifying the target file. Details of the file-specific information will be described later. In addition, the file encryption unit 101 executes various kinds of information processes. For example, the file encryption unit 101 outputs the information input on the screen of the encryption terminal 100 in the first transmission unit 102. For example, the file encryption unit 101 receives information output from the first reception unit 103. For example, the file encryption unit 101 displays a predetermined message on the screen of the encryption terminal 100 based on the received information.

The first transmission unit 102 transmits the information output from the file encryption unit 101 to the management server 200. The first reception unit 103 outputs the information output from the management server 200 to the file encryption unit 101. Details of the first transmission unit 102 and the first reception unit 103 will be described later.

Next, the function of the decryption terminal 400 will be described with reference to FIG. 5.

Figure 5:
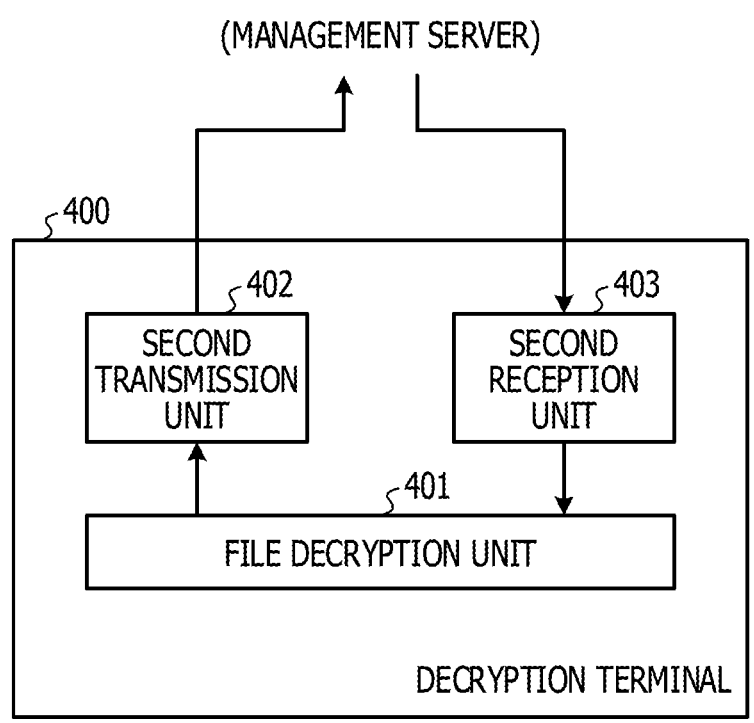
FIG. 5 is an example of a functional block diagram of the decryption terminal.

FIG. 5 is an example of a functional block diagram of the decryption terminal 400. The decryption terminal 400 includes a file decryption unit 401 as a decryption unit, a second transmission unit 402 as a transmission unit, and a second reception unit 403 as a reception unit.

The file decryption unit 401 decrypts the encrypted file. More specifically, the file decryption unit 401 starts decrypting the encrypted file upon detecting a specific operation on the encrypted file. When the file decryption unit 401 starts decryption of the encrypted file, the decryption request information including a combination of the above-described file-specific information included in the encrypted file and the MAC address identifying the decryption terminal 400 is output to the second transmission unit 402. Instead of a MAC address, basic input and output system (BIOS) information and serial number may be used as identification information. On the other hand, upon receiving the information output from the second reception unit 403, the file decryption unit 401 determines whether or not to decrypt the encrypted file based on the received information. The file decryption unit 401 decrypts the encrypted file in a case where the received information is decryption permission information that permits decryption. On the other hand, the file decryption unit 401 stops decrypting the encrypted file in a case where the received information is decryption rejection information that rejects decryption. In a case where the file decryption unit 401 stops decrypting the encrypted file, the file decryption unit 401 displays a predetermined message indicating the cancellation of decryption on the screen of the decryption terminal 400.

The second transmission unit 402 transmits the decryption request information output from the file decryption unit 401 to the management server 200. That is, the second transmission unit 402 transmits the decryption request information including the combination of the above-described file-specific information and the identification information to the management server 200. The second reception unit 403 receives information output from the management server 200. More specifically, the second reception unit 403 receives the information transmitted from the management server 200 based on the information transmitted by the second transmission unit 402 and outputs the information to the file decryption unit 401. Details of the second transmission unit 402 and the second reception unit 403 will be described later.

Next, the function of the management server 200 will be described with reference to FIG. 6.

Figure 6:
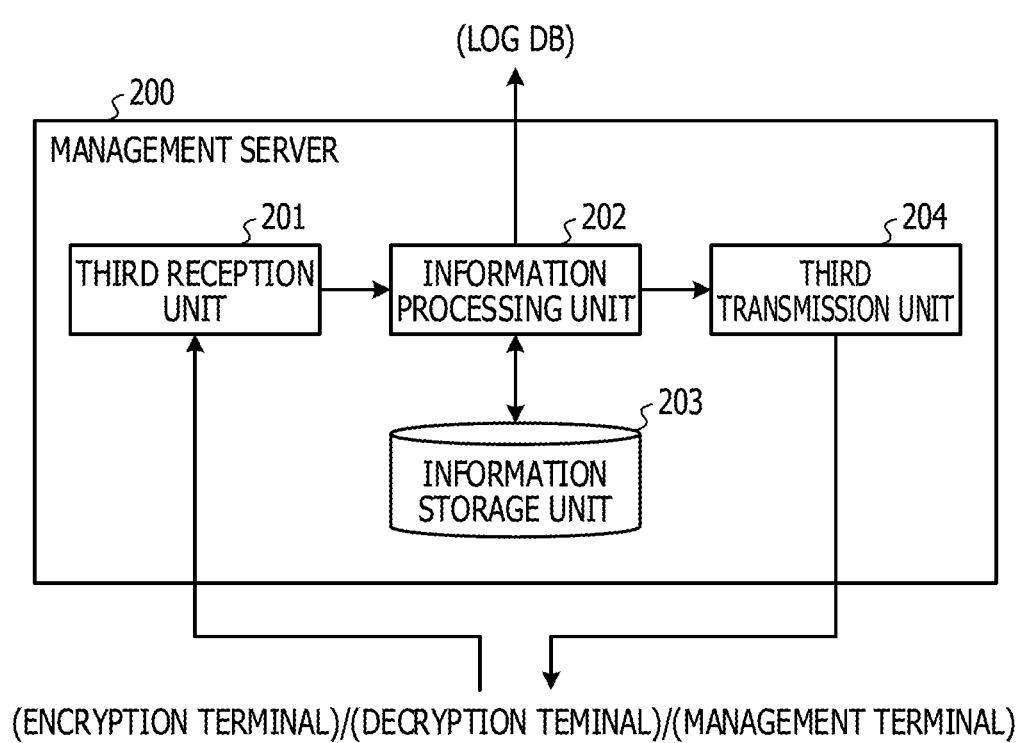
FIG. 6 is an example of a functional block diagram of the management server.

FIG. 6 is an example of a functional block diagram of the management server 200. The management server 200 includes a third reception unit 201 as a reception unit, an information processing unit 202 as a determination unit, an information storage unit 203, and a third transmission unit 204 as a transmission unit.

The third reception unit 201 receives information transmitted from the encryption terminal 100, the decryption terminal 400, and the management terminal 500. For example, the third reception unit 201 receives the operation contents of the operations performed in the encryption terminal 100 and the decryption terminal 400. For example, the third reception unit 201 receives pre-request information or take-out request information to be described later from the encryption terminal 100. For example, the third reception unit 201 receives the above-described decryption request information from the decryption terminal 400. Upon receiving the information, the third reception unit 201 outputs the received information to the information processing unit 202.

Upon receiving the information output from the third reception unit 201, the information processing unit 202 executes various types of information process on the received information. For example, in a case where the received information is an operation content, the information processing unit 202 records the operation content in the log DB 300 as a log. For example, in a case where the received information is the pre-request information, the information processing unit 202 stores request items included in the pre-request information before being decrypted (more specifically, before being encrypted) in the information storage unit 203. For example, the information processing unit 202 generates file-specific information in a case where the received information is take-out request information. For example, in a case where the received information is the decryption request information, the information processing unit 202 refers to the information storage unit 203 to determine whether or not the decryption request information matches the pre-request information. Upon completion of the determination, the information processing unit 202 generates the decryption permission or rejection information including the decryption permission information that permits decryption according to the determination result or the decryption rejection information that rejects decryption and outputs the information to the third transmission unit 204. As described above, the file-specific information is information in a predetermined format uniquely specifying the target file and is a combination of an operation date and time and a plurality of alphanumeric values randomly extracted.

The third transmission unit 204 transmits the decryption permission or rejection information output from the information processing unit 202 to the decryption terminal 400. That is, the third transmission unit 204 transmits the decryption permission information or the decryption rejection information to the decryption terminal 400.

Next, respective operations of the encryption terminal 100 and the management server 200 regarding the pre-request process will be described with reference to FIGS. 7 to 9. The pre-request process is a process of requesting for taking out a file in advance before the date of taking out the target file.

Figure 7:
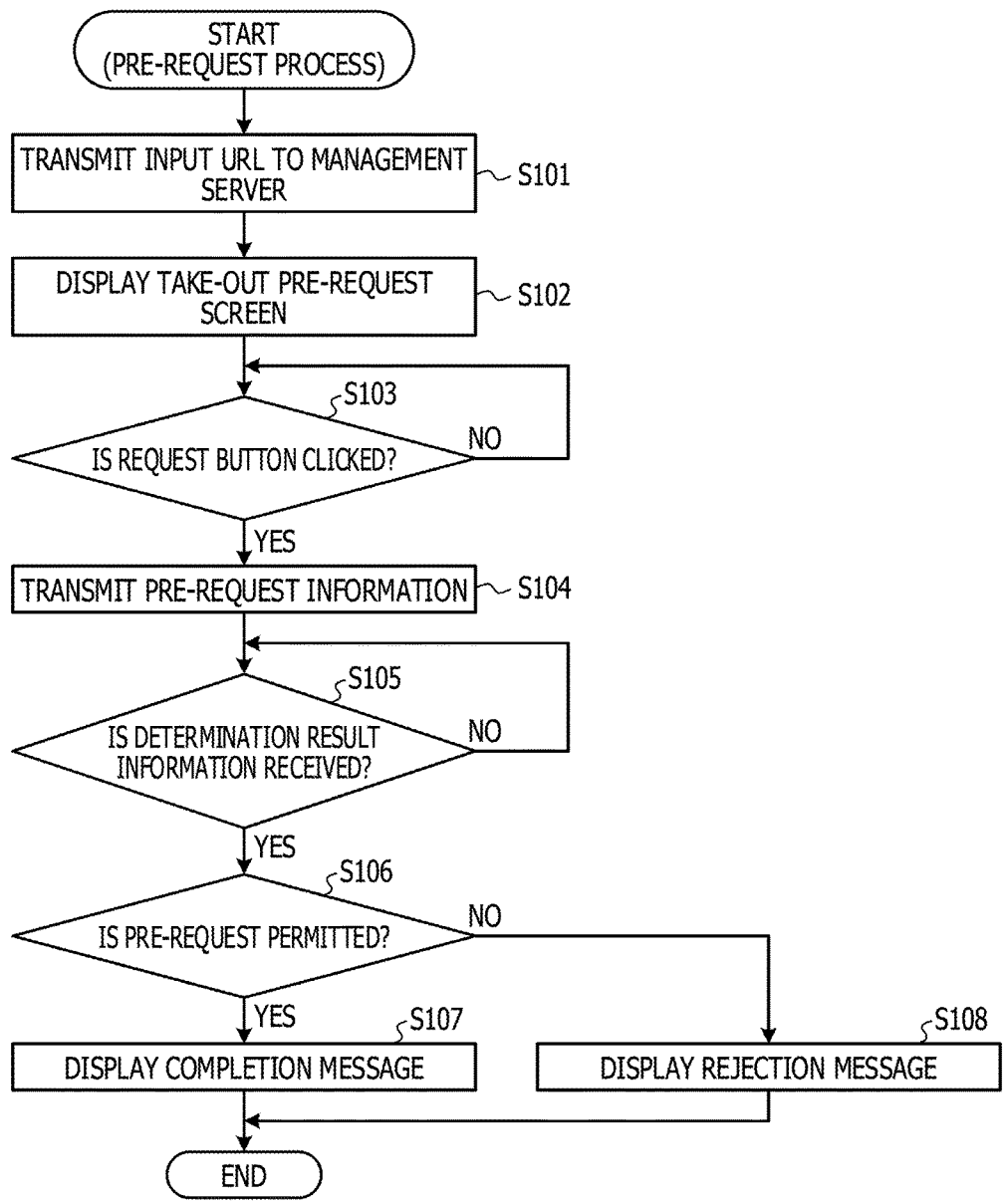
FIG. 7 is a flowchart illustrating an example of a pre-request process that the encryption terminal executes.

FIG. 7 is a flowchart illustrating an example of a pre-request process that the encryption terminal 100 executes. FIG. 8 is a flowchart illustrating an example of the pre-request process that the management server 200 executes. FIGS. 9A to 9C are examples of a take-out pre-request screen. The take-out pre-request screen is displayed on the encryption terminal 100.

First, as illustrated in FIG. 7, the first transmission unit 102 of the encryption terminal 100 transmits the input uniform resource locator (URL) to the management server 200 (step S101). For example, upon detecting an operation of activating a Web browser, the file encryption unit 101 activates the Web browser and displays a home screen (for example, default screen) preset in the Web browser. When the file encryption unit 101 detects that a predetermined URL specifying the management server 200 is entered in the input field of a URL included in the home screen, the first transmission unit 102 transmits the input URL to the management server 200.

Figure 8:
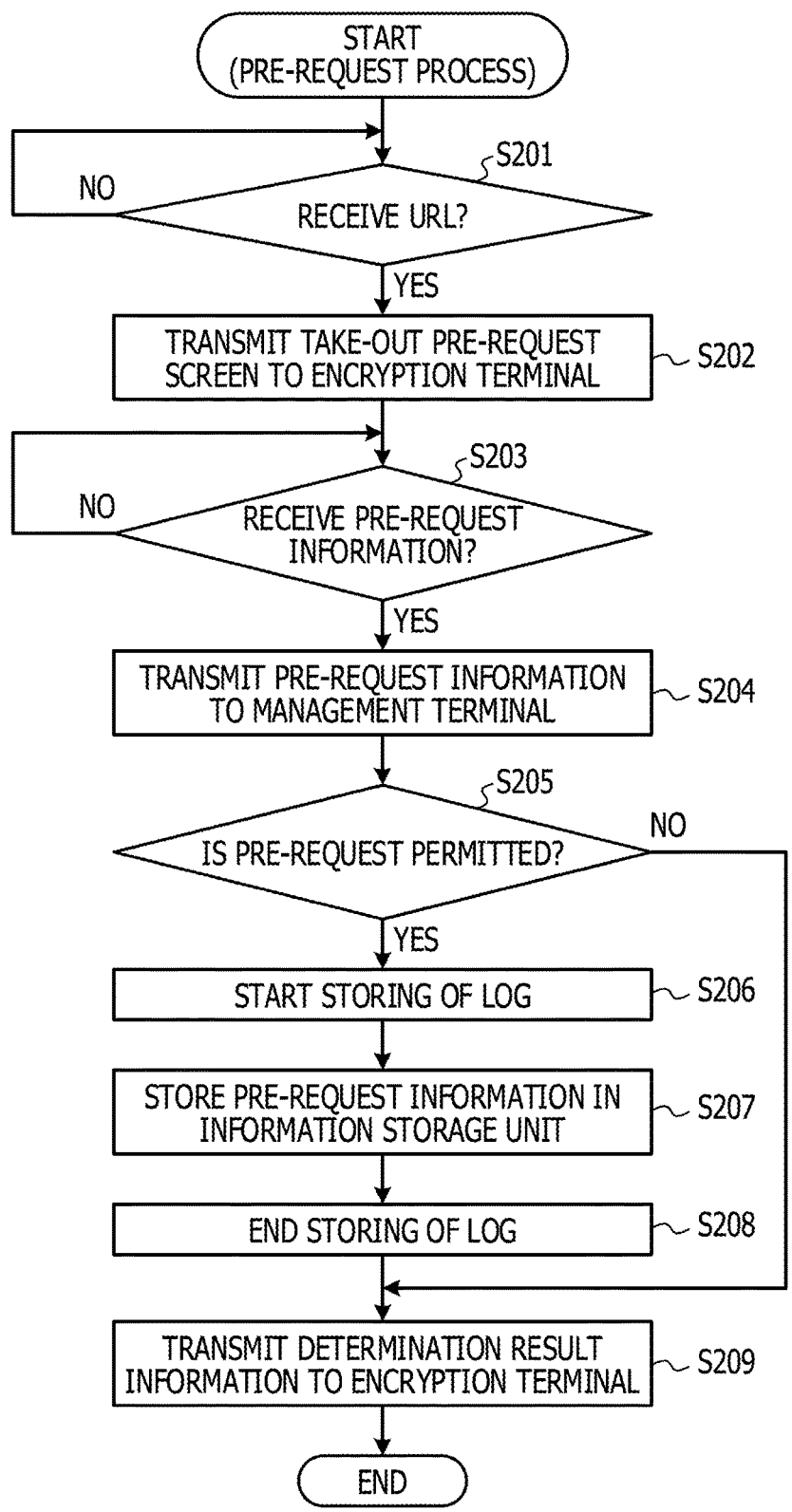
FIG. 8 is a flowchart illustrating an example of the pre-request process that the management server executes.

On the other hand, as illustrated in FIG. 8, the third reception unit 201 of the management server 200 waits until a URL is received (step S201: NO). When the third reception unit 201 determines that the URL is received (step S201: YES), the third transmission unit 204 transmits the take-out pre-request screen to the encryption terminal 100 (step S202). More specifically, the information processing unit 202 outputs the take-out pre-request screen specified by the URL received by the third reception unit 201 to the third transmission unit 204, and the third transmission unit 204 transmits the take-out pre-request screen. The take-out pre-request screen is pre-registered in the management server 200. Upon completion of the process of step S202, the third reception unit 201 waits until the pre-request information to be described later is received (step S203: NO).

Returning to FIG. 7, when the first reception unit 103 of the encryption terminal 100 receives the take-out pre-request screen transmitted from the management server 200, the file encryption unit 101 displays the take-out pre-request screen received by the first reception unit 103 (step S102). As a result, in the display device 720 of the encryption terminal 100, as illustrated in FIG. 9A, the take-out pre-request screen appears. Upon completion of the process of step S102, the file encryption unit 101 waits until clicking of a request button Bt1 included in the take-out pre-request screen is detected (step S103: NO).

Here, as illustrated in FIG. 9A, in addition to the above-described request button Bt1, the take-out pre-request screen includes a plurality of input fields Bx1 to Bx6. The input field Bx1 is an input field for specifying a take-out date of a target file. The input field Bx2 is an input field for specifying the name of a person who is going to take out the target file. The input field Bx3 is an input field for specifying the MAC address of the decryption terminal 400 that decrypts an encrypted file. The input field Bx4 is an input field for specifying an expiration date for decrypting the encrypted file. The expiration date is set in a way that the expiration date may not be specified beyond the expiration date preset in the management server 200. The input field Bx5 is an input field for specifying the file name and folder name of the target file.

The input field Bx6 is an input field of a URL. In the input field Bx6, the URL of the management server 200 is displayed. The above-described home screen includes an input field similar to the input field Bx6, and the URL of the management server 200 is input to the input field. A user who takes out a target file performs an operation of entering pre-request items in the input fields Bx1 to Bx5 and clicks the request button Bt1. Specifically, a pointer Pt is moved to the area of the request button Bt1, and a specific operation (for example, clicking) is performed. In this way, the first transmission unit 102 detects clicking of the request button Bt1 (step S103: YES).

When the file encryption unit 101 detects clicking of the request button Bt1, the first transmission unit 102 transmits the pre-request information (step S104). More specifically, the file encryption unit 101 generates the pre-request information including pre-request items input in each of the input fields Bx1 to Bx5, and the first transmission unit 102 transmits the generated pre-request information to the management server 200. Upon completion of the process of step S104, the first reception unit 103 waits until determination result information to be described later is received (step S105: NO).

Proceeding to FIG. 8, when the third reception unit 201 receives the pre-request information (step S203: YES), the third transmission unit 204 transmits the pre-request information to the management terminal 500 (step S204). Upon completion of the process of step S204, the information processing unit 202 determines whether or not the pre-request is permitted (step S205). More specifically, the management terminal 500 which has received the pre-request information displays the pre-request items included in the pre-request information. The system administrator operating the management terminal 500 checks the pre-request items, determines whether or not to permit the pre-request items, and enters the determination result in the management terminal 500. When the management terminal 500 transmits the determination result to the management server 200, the third reception unit 201 receives the determination result and outputs the determination result to the information processing unit 202. The information processing unit 202 determines whether or not the pre-request is permitted based on the determination result.

In a case where the pre-request is permitted by the determination result (step S205: YES), the information processing unit 202 starts storing the log to the log DB 300 (step S206) and stores the pre-request information in the information storage unit 203 (step S207). In this way, the pre-request items included in the pre-request information are recorded in the log DB 300. Upon completion of the process of step S207, the information processing unit 202 ends storing the log to the log DB 300 (step S208), and the third transmission unit 204 transmits the determination result information to the encryption terminal 100 (step S209). More specifically, upon completion of the process of step S208, the information processing unit 202 generates determination result information including information indicating permission of the pre-request items, and the third transmission unit 204 transmits the generated determination result information.

On the other hand, in a case where the pre-request is not permitted according to the determination result (step S205: NO), the information processing unit 202 skips the process of steps S206 to S208, and the third transmission unit 204 transmits the determination result information to the encryption terminal 100 (step S209). More specifically, in a case where the pre-request is not permitted in the process of step S205, the information processing unit 202 generates determination result information including information indicating rejection of the pre-request items, and the third transmission unit 204 transmits the generated determination result information.

Returning to FIG. 7, when the first reception unit 103 receives the determination result information transmitted from the management server 200 (step S105: YES), the file encryption unit 101 determines whether or not the pre-request is permitted (step S106). In a case where the determination result information includes information indicating permission of the pre-request items, the file encryption unit 101 determines that the pre-request is permitted (step S106: YES), and displays a completion message (step S107). In this way, in the display device 720 of the encryption terminal 100, as illustrated in FIG. 9B, a screen of the completion message indicating that the pre-request has been completed is displayed.

On the other hand, in a case where the determination result information includes information indicating rejection of the pre-request items, the file encryption unit 101 determines that the pre-request is not permitted (step S106: NO), and displays a rejection message (step S108). In this way, in the display device 720 of the encryption terminal 100, as illustrated in FIG. 9C, a screen of the rejection message indicating that the pre-request is not permitted is displayed. Upon completion of the process of step S107 or S108, the pre-request process is ended.

Next, respective operations of the encryption terminal 100 and the management server 200 regarding the take-out execution process will be described with reference to FIGS. 10 to 12.

Figure 10:
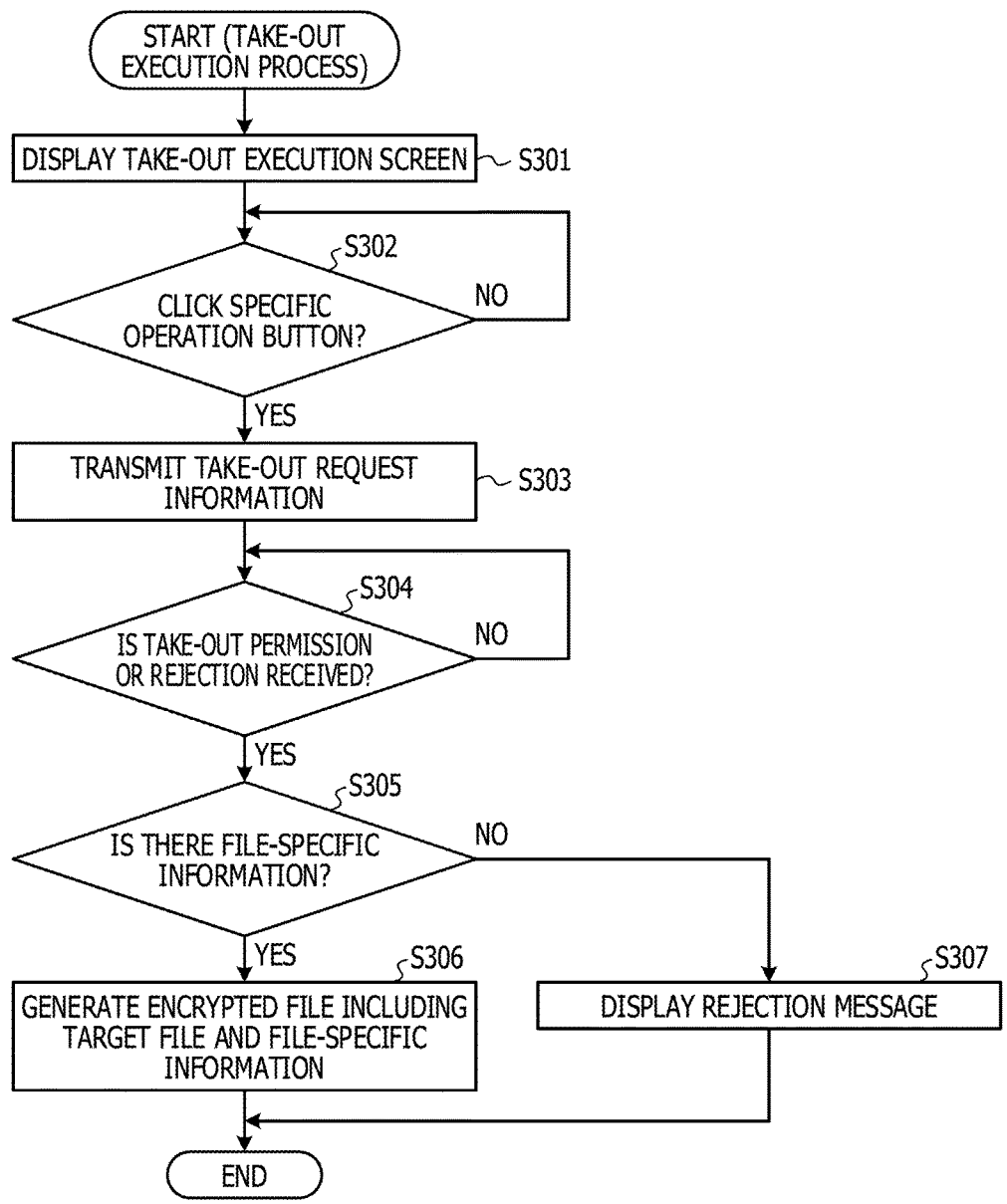
FIG. 10 is a flowchart illustrating an example of a take-out execution process that the encryption terminal executes.
Figure 11:
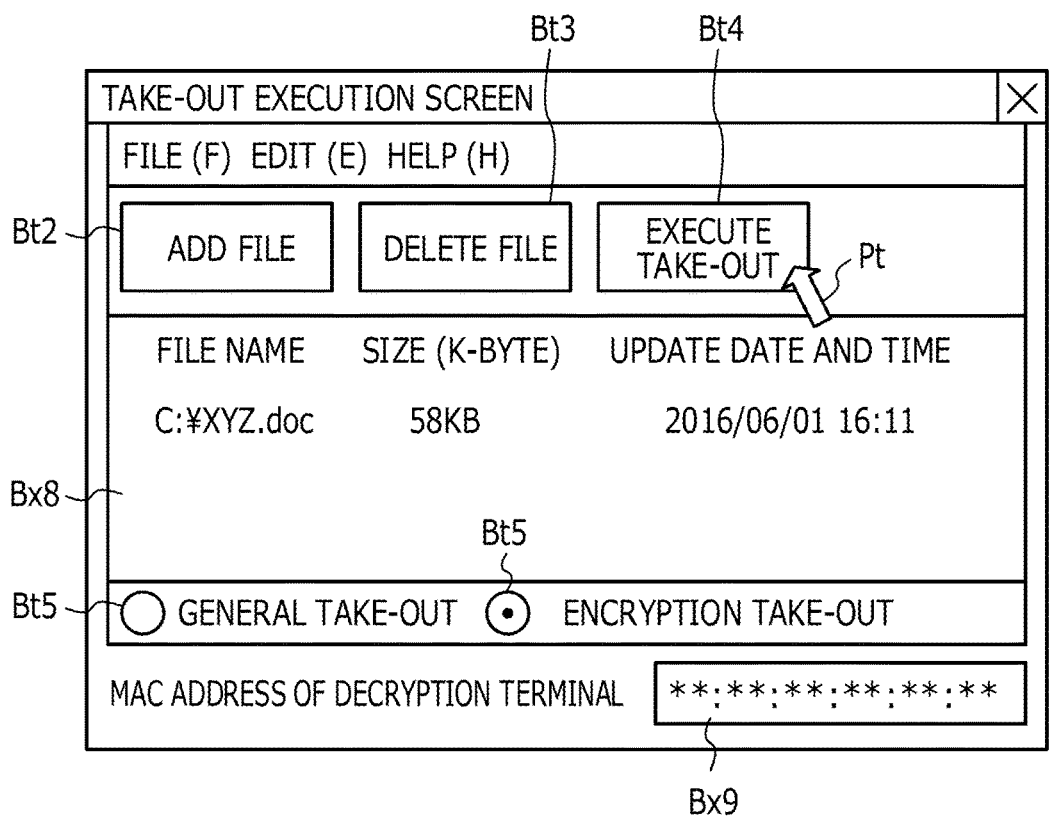
FIG. 11 is an example of a take-out execution screen.

FIG. 10 is a flowchart illustrating an example of a take-out execution process that the encryption terminal 100 executes. FIG. 11 is an example of the take-out execution screen. FIG. 12 is a flowchart illustrating an example of the take-out execution process that the management server 200 executes. The take-out execution screen is displayed on the encryption terminal 100.

First, as illustrated in FIG. 10, the file encryption unit 101 displays the take-out execution screen (step S301) and waits until clicking of a specific operation button Bt4 is detected (step S302: NO). More specifically, when the above-described pre-request process ends and the file encryption unit 101 detects an operation of activating the take-out execution screen on the day of the take-out date of the target file, the file encryption unit 101 activates the take-out execution screen. In this way, the take-out execution screen appears on the display device 720 of the encryption terminal 100. The take-out execution screen includes, as illustrated in FIG. 11, a plurality of operation buttons Bt2 to Bt4, a target file display field Bx8, a selection button Bt5 for take-out type, and a MAC address input field Bx9.

The operation button Bt2 is a button for adding a target file to be displayed on the target file display field Bx8. For example, when the user clicks the operation button Bt2 with the pointer Pt, the file encryption unit 101 detects the clicking of the operation button Bt2 and displays the selection screen of the target file to be taken out. When the user specifies a target file in the selection screen, the specified target file is displayed in the target file display field Bx8. A target file to be encrypted is specified by repeating the operation. Therefore, the target file to be encrypted may be one or plural. Instead of clicking the operation button Bt2, a specific operation (for example, drag-and-drop) may be performed on the target file to display the target file in the target file display field Bx8.

The operation button Bt3 is a button for deleting a target file to be displayed on the target file display field Bx8. For example, if the target file displayed on the target file display field Bx8 is specified and the file encryption unit 101 detects an operation of clicking the operation button Bt3, the file encryption unit 101 deletes the target file displayed on the target file display field Bx8.

The operation button Bt4 is a button for starting the take-out execution process. More specifically, the operation button Bt4 is a button for starting the take-out execution process after step S303. In a state in which the target file is displayed in the target file display field Bx8, the selection button Bt5 for each take-out type is selected, and a MAC address is input to the MAC address input field Bx9, when the file encryption unit 101 detects an operation of clicking the operation button Bt4, the file encryption unit 101 generates take-out request information. More specifically, the file encryption unit 101 generates take-out request information including the target file, the folder in which the target file is stored, the name of the person who is going to take out the target file, the take-out date and time, and the MAC address as request items.

The file encryption unit 101 stores, for example, computer name or login user name set in the encryption terminal 100 as the name of a person who is going to take out the target file in the take-out request information. Further, the file encryption unit 101 stores the date on which an operation of clicking the operation button Bt4 is detected as a take-out date in the take-out request information. The date on which the operation of clicking the operation button Bt4 is detected, is specified, for example, by the calendar information managed by the encryption terminal 100.

When the file encryption unit 101 detects clicking of the specific operation button Bt4 (step S302: YES), the first transmission unit 102 transmits the take-out request information (step S303). More specifically, when detecting the clicking of the specific operation button Bt4, the file encryption unit 101 generates the take-out request information as described above, and the first transmission unit 102 transmits the generated take-out request information to the management server 200. Upon completion of the process of step S303, the first reception unit 103 waits until take-out permission or rejection information to be described later is received (step S304: NO).

Figure 12:
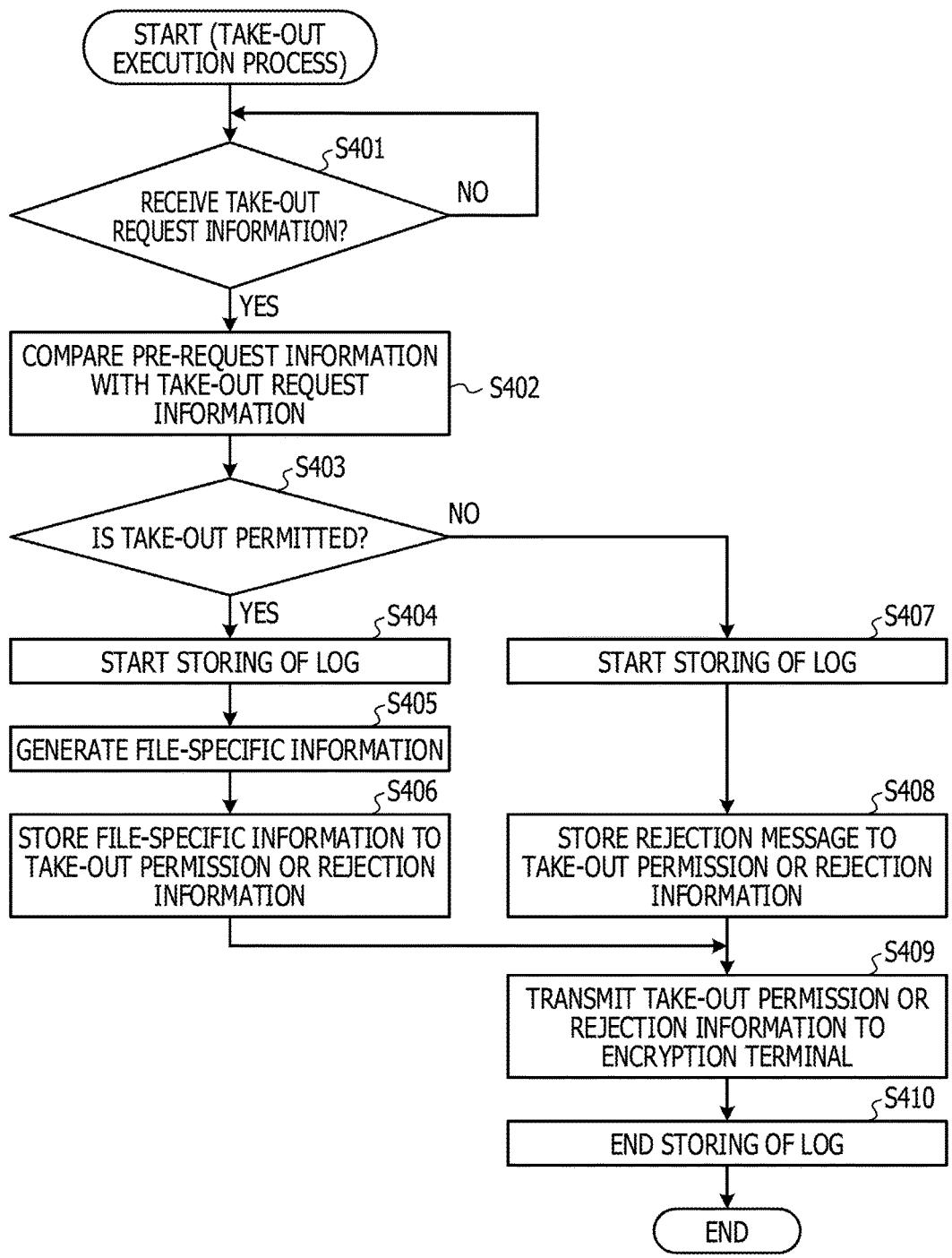
FIG. 12 is a flowchart illustrating an example of the take-out execution process that the management server executes.

Proceeding to FIG. 12, the third reception unit 201 of the management server 200 waits until take-out request information is received (step S401: NO). When the third reception unit 201 receives take-out request information (step S401: YES), the information processing unit 202 compares the pre-request information with the take-out request information (step S402). More specifically, the information processing unit 202 compares the request items included in the take-out request information received by the third reception unit 201 with the pre-request items of the pre-request information obtained from the information storage unit 203.

Upon completion of the process of step S402, the information processing unit 202 determines whether or not to permit take-out (step S403). More specifically, the information processing unit 202 determines whether or not the request items included in the take-out request information respectively match the pre-request items included in the pre-request information. As for the expiration date item, the information processing unit 202 determines that there is a match if the take-out date is within the expiration date.

In a case where the information processing unit 202 determines that the request items included in the take-out request information and the pre-request items included in the pre-request information all match, the information processing unit 202 determines to permit the take-out request (step S403: YES) and starts storing the log to the log DB 300 (step S404). Upon completion of the process of step S404, the information processing unit 202 generates file-specific information (step S405). More specifically, the information processing unit 202 randomly extracts a plurality of alphanumeric values and generates file-specific information in a combination of the operation date and time with the extracted plurality of alphanumeric values. Even if the take-out request information includes a plurality of target files, the information processing unit 202 generates one piece of file-specific information. Then, the information processing unit 202 stores the generated file-specific information in the take-out permission or rejection information (step S406).

On the other hand, in a case where the information processing unit 202 determines that at least one of the request items included in the take-out request information and the pre-request items of the pre-request information does not match, the information processing unit 202 determines to reject the take-out request (step S403: NO) and starts storing the log to the log DB 300 (step S407). Then, the information processing unit 202 stores a rejection message in the take-out permission or rejection information (step S408). The rejection message is a message including a reason why the take-out request is rejected (for example, a difference in the pre-request items such as a difference in the name of the file to be taken out).

Upon completion of the process in step S407 or step S408, the third transmission unit 204 transmits the take-out permission or rejection information to the encryption terminal 100 (step S409). More specifically, the third transmission unit 204 obtains the take-out permission or rejection information from the information processing unit 202 and transmits the obtained take-out permission or rejection information. Upon completion of the process of step S409, the information processing unit 202 ends storing the log to the log DB 300. In this way, the log DB 300 records the file-specific information and the request items that do not match.

Returning to FIG. 10, when the first reception unit 103 receives the take-out permission or rejection information (step S304: YES), the file encryption unit 101 determines whether or not there is file-specific information (step S305). More specifically, the file encryption unit 101 determines whether or not there is file-specific information in the take-out permission or rejection information received by the first reception unit 103. In a case where the file encryption unit 101 determines that there is the file-specific information (step S305: YES), the file encryption unit 101 generates an encrypted file including the target file and the file-specific information (step S306) and ends the process. In a case where a plurality of target files are displayed in the target file display field Bx8, the file encryption unit 101 encrypts the plurality of target files and file-specific information thereof collectively to generate encrypted files. On the other hand, in a case where the file encryption unit 101 determines that there is no file-specific information (step S305: NO), the file encryption unit 101 displays a rejection message (step S307) and ends the process. That is, the file encryption unit 101 obtains a rejection message included in the take-out permission or rejection information and displays the message on the display device 720.

Next, respective operations of the decryption terminal 400 and the management server 200 regarding the decryption process will be described with reference to FIGS. 13 and 14.

Figure 13:
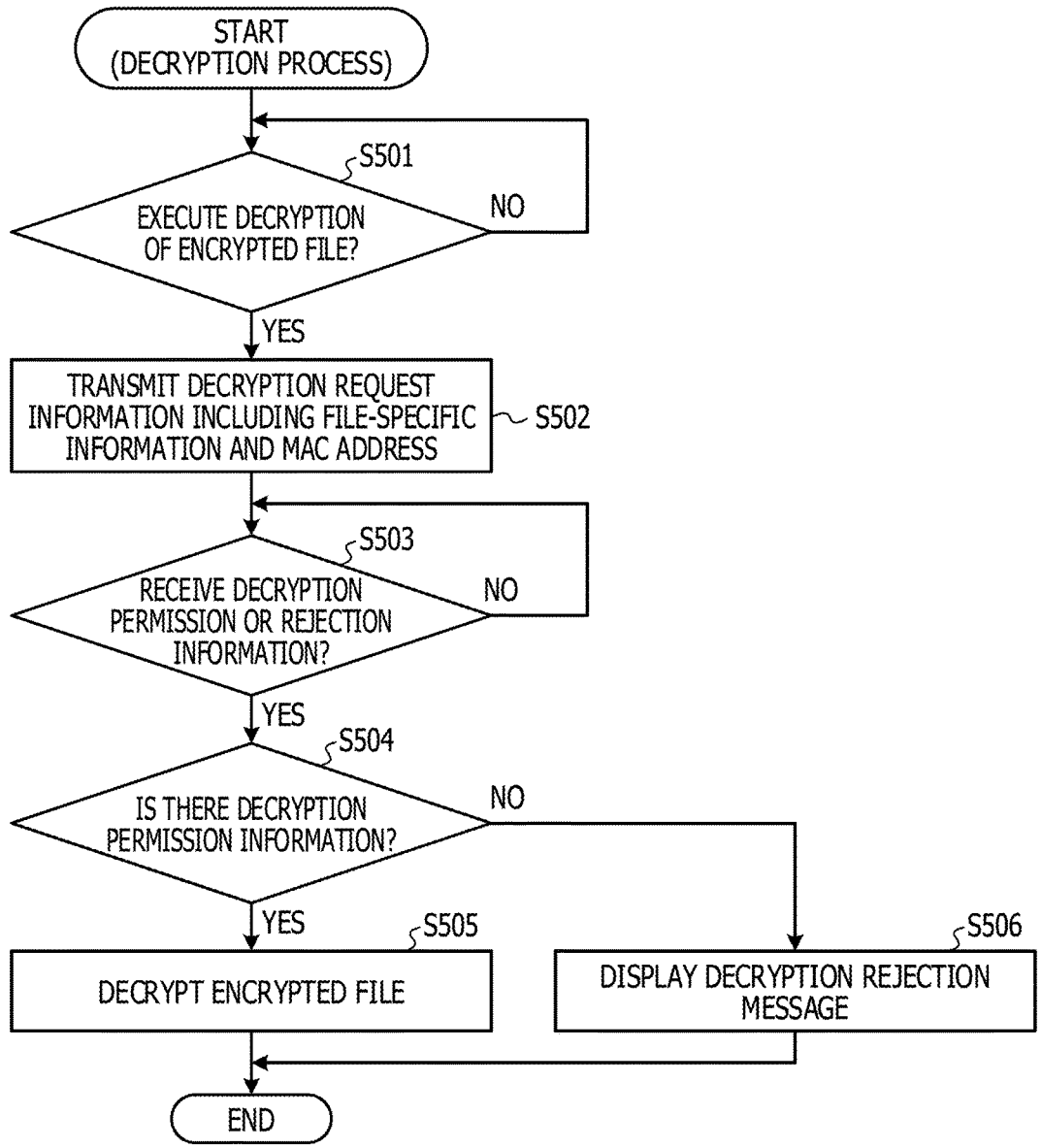
FIG. 13 is a flowchart illustrating an example of a decryption process that the decryption terminal executes.

FIG. 13 is a flowchart illustrating an example of a decryption process that the decryption terminal 400 executes. FIG. 14 is a flowchart illustrating an example of the decryption process that the management server 200 executes. The decryption process is started, for example, after the semiconductor memory 730 in which an encrypted file is stored is connected to the decryption terminal 400 and the encrypted file is moved or replicated from the semiconductor memory 730 to the decryption terminal 400.

More specifically, as illustrated in FIG. 13, the file decryption unit 401 of the decryption terminal 400 waits until decryption of the encrypted file is executed (step S501: NO). When the file decryption unit 401 decrypts the encrypted file (step S501: YES), the second transmission unit 402 transmits decryption request information including the file-specific information and the MAC address (step S502). For example, when a specific operation (for example, double-click, and the like) is performed on the encrypted file that has moved onto the screen of the decryption terminal 400, the file decryption unit 401 detects the operation, and the second transmission unit 402 transmits the decryption request information to the management server 200. Upon completion of the process of step S502, the second reception unit 403 waits until the decryption permission or rejection information to be described later is received (step S503: NO). The above-described various request items may be included in the decryption request information.

Figure 14:
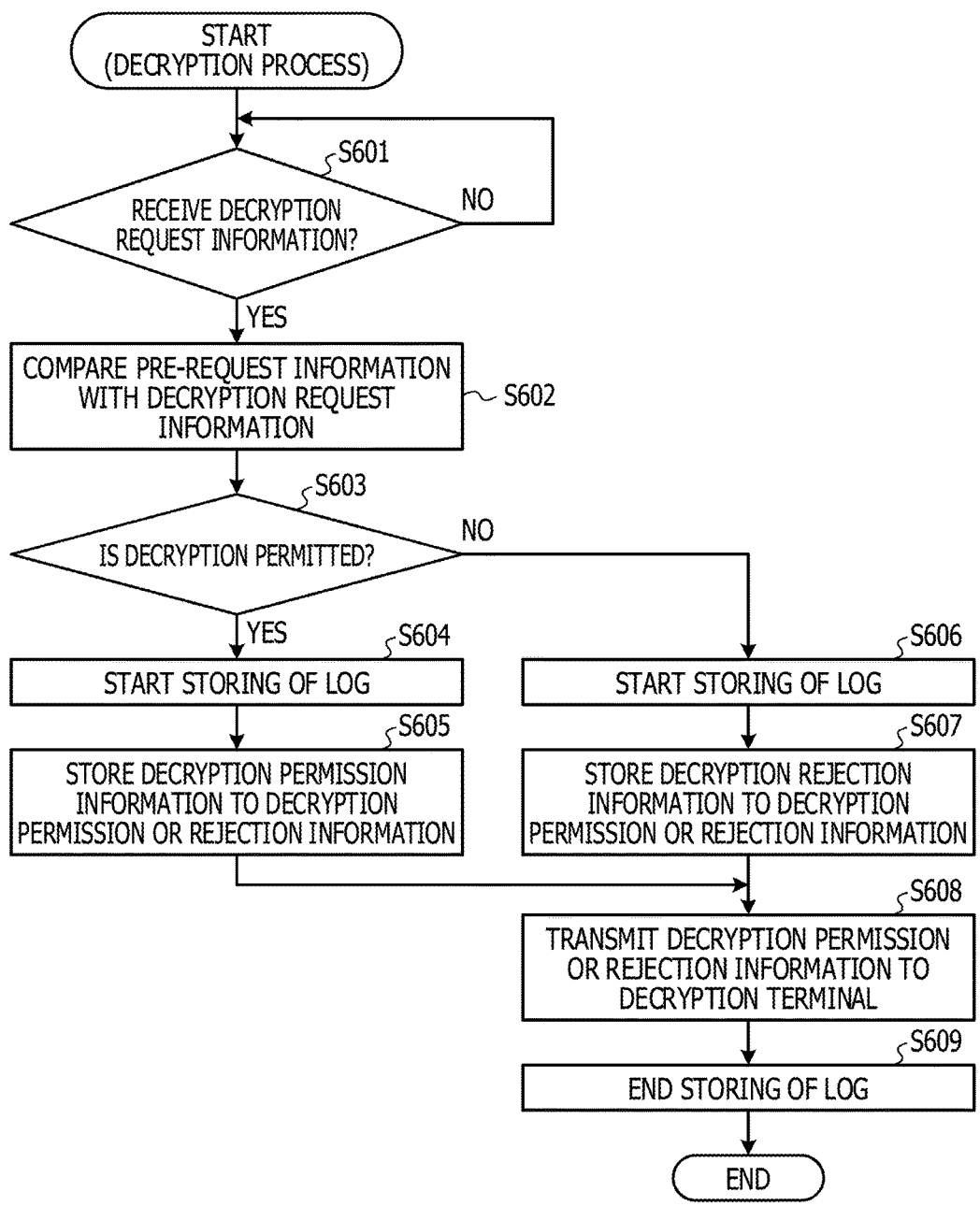
FIG. 14 is a flowchart illustrating an example of the decryption process that the management server executes.

Proceeding to FIG. 14, the third reception unit 201 of the management server 200 waits until decryption request information is received (step S601: NO). When the third reception unit 201 receives decryption request information (step S601: YES), the information processing unit 202 compares the pre-request information with the decryption request information (step S602). More specifically, the information processing unit 202 compares the pre-request information with the request items included in each piece of the decryption request information.

Upon completion of the process of step S602, the information processing unit 202 determines whether or not to permit decryption (step S603). More specifically, in the case where all the request items included in each piece of the pre-request information and the decryption request information match as a result of comparing in the process of step S602, the information processing unit 202 determines to permit decryption (step S603: YES). As for the expiration date, the information processing unit 202 determines that there is a match if the decryption date is within the expiration date. On the other hand, when at least one of the request items included in each piece of the pre-request information and the decryption request information does not match as a result of comparing in the process of step S602, the information processing unit 202 determines to reject decryption (step S603: NO).

In a case where the information processing unit 202 determines to permit decryption, the information processing unit 202 starts storing the log to the log DB 300 (step S604) and stores decryption permission information in the decryption permission or rejection information (step S605). The decryption permission information is information permitting decryption of the encrypted file. On the other hand, in a case where the information processing unit 202 determines to reject decryption, the information processing unit 202 starts storing the log to the log DB 300 (step S606) and stores decryption rejection information in the decryption permission or rejection information (step S607). The decryption rejection information is information rejecting decryption of the encrypted file.

Upon completion of the process in step S605 or step S607, the third transmission unit 204 transmits the permission or rejection information to the decryption terminal 400 (step S608). Upon completion of the process in step S608, the information processing unit 202 ends storing the log to the log DB 300 (step S609). In this way, various kinds of information regarding decryption of the encrypted file are recorded in the log DB 300. For example, since the file-specific information is recorded in the log DB 300, even after the target file is taken out, it is possible to uniquely trace the target file by checking the log DB 300.

Returning to FIG. 13, when the second reception unit 403 receives the decryption permission or rejection information (step S503: YES), the file decryption unit 401 determines whether or not there is decryption permission information (step S504). More specifically, the file decryption unit 401 determines whether or not the decryption permission/acceptance information received by the second reception unit 403 includes the decryption permission information. In a case where the file decryption unit 401 determines that there is the decryption permission information (step S504: YES), the file decryption unit 401 decrypts the encrypted file (step S505). On the other hand, in a case where the file decryption unit 401 determines that there is no decryption permission information (step S504: NO), the file decryption unit 401 displays a decryption rejection message (step S506). More specifically, if there is the decryption rejection information, the file decryption unit 401 stops the decryption of the encrypted file and displays the decryption rejection message indicating that the decryption is rejected on the display unit 400G of the decryption terminal 400.

Next, the above-described take-out execution process and the decryption process will be described in more detail with reference to FIG. 15.

Figure 15:
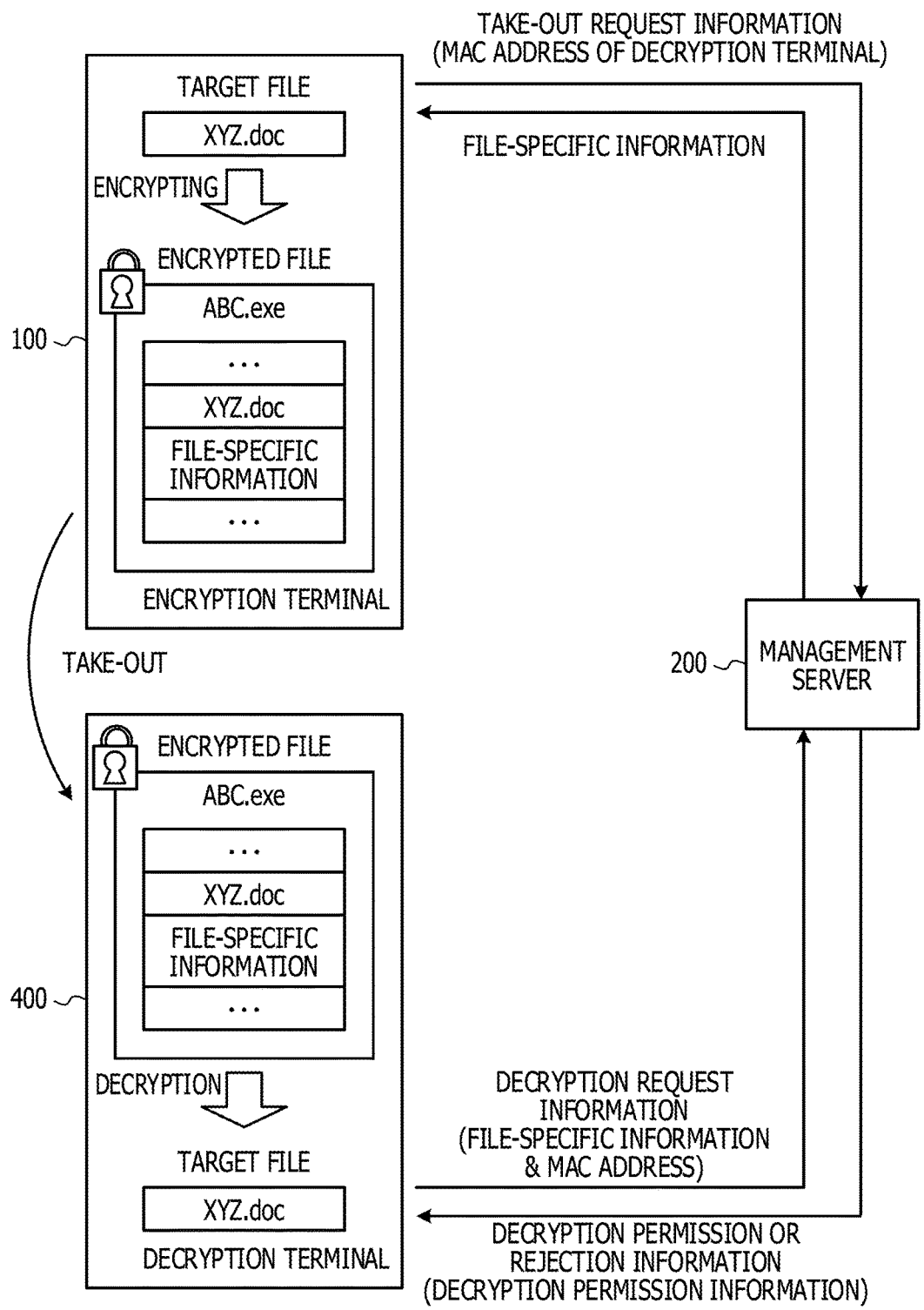
FIG. 15 is a diagram for explaining an example of the take-out execution process and the decryption process.

FIG. 15 is a diagram for explaining an example of the take-out execution process and the decryption process. As described above, when executing the take-out execution process, the encryption terminal 100 transmits the take-out request information including the MAC address of the decryption terminal 400 to the management server 200. The other request items included in the take-out request information are omitted and not displayed. Upon receiving the take-out request information, the management server 200 generates file-specific information to transmit to the encryption terminal 100. Upon receiving the file-specific information, the encryption terminal 100 generates an encrypted file including the target file and the file-specific information. The encrypted file is stored, for example, in the semiconductor memory 730, or recorded in the portable recording medium 740, and is taken out.

On the other hand, when executing the decryption process on the encrypted file, the decryption terminal 400 transmits the decryption request information including the file-specific information and the MAC address to the management server 200. The other request items included in the decryption request information are omitted and not displayed. Upon receiving the decryption request information, the management server 200 determines whether or not to permit the decryption, and transmits the decryption permission or rejection information including the determination result to the decryption terminal 400. If the decryption permission or rejection information includes the decryption permission information, the decryption terminal 400 decrypts the encrypted file. In this way, the target file appears in the decryption terminal 400.

FIGS. 16A and 16B are diagrams for explaining a specific example of the target file by file-specific information. More specifically, FIG. 16A illustrates a comparative example, and FIG. 16B illustrates an example.

First, according to the comparative example, as illustrated in FIG. 16A, when various operations are performed on the target file, a log of the operations is recorded in the log DB 300. For example, when an operation to generate and update the target file having a file name "XYZ.doc" is performed, a log of the operation is recorded in the log DB 300. Similarly, when an operation to copy and update the target file of the file name "XYZ.doc" from the shared server (not illustrated) is performed, a log of the operation is recorded in the log DB 300. When an operation to generate and update the target file having a file name "PQR.doc" is performed, a log of the operation is recorded in the log DB 300.

Here, when the encryption terminal 100 encrypts target files, three encrypted files having a same encrypted file name "ABC.exe" and different generation dates and times are generated. These generated encrypted files are taken out by the user and decrypted by the decryption terminal 400. At this time, when an original target file is distinguished based on the generation date and time of the encrypted files, the original target file may be distinguished if each generation date and time is different from one another. However, since the generation date and time may be changed by the function of an operating system (OS), if the generation date and time is altered, there is a possibility that a target file which may not be decrypted is decrypted.

By contrast, according to the example, as illustrated in FIG. 16B, when the encryption terminal 100 encrypts the target files, three encrypted files having the same encrypted file name "ABC.exe" and different file-specific information are generated. These generated encrypted files are taken out by the user and decrypted by the decryption terminal 400. The file-specific information may not be changed by the function of the OS. Therefore, there is no possibility that the file-specific information is tampered with and the target file is decrypted. Further, since the file-specific information is transmitted to the management server 200, and the encrypted file is decrypted by the decryption permission information transmitted based on the comparison result of the file-specific information, the encrypted files having different file-specific information are not decrypted.

As described above, according to the present embodiment, the management server 200 includes the third reception unit 201, the information processing unit 202, and the third transmission unit 204. The third reception unit 201 receives the decryption request information including a combination of the file-specific information which is different for each operation of taking out a target file and the MAC address identifying the decryption terminal 400 from the decryption terminal 400. The information processing unit 202 refers to the information storage unit 203 storing the pre-request information including the combination of the file-specific information and the MAC address and determines whether or not the decryption request information received by the third reception unit 201 matches the pre-request information. In a case where the decryption request information matches the pre-request information, the third transmission unit 204 transmits the decryption permission information that permits decryption of the encrypted file to the decryption terminal 400. In this way, it is possible to avoid leakage of information from the target file that has been taken out.

Although the preferred embodiment of the present disclosure has been described in detail above, the present disclosure is not limited to a specific embodiment of the present disclosure, and various modifications and changes may be made within the scope of the gist of the present disclosure described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a control program that causes a computer to execute a process, the process comprising:
   receiving a uniform resource locator (URL) of a management terminal from a terminal device;
   transmitting, to the terminal device, a take-out pre-request screen specifying the URL;
   receiving specified information generated in response to reception of an acquisition request of data from the terminal device that decrypts an encrypted data corresponding to the data, and identification information on the terminal device, the specified information including a plurality of alphanumeric values that differ for each of an operation date and time of the data, the acquisition request of the data from the terminal device being received after a pre-request permission for the data is sent to the terminal device, the pre-request permission being granted by the management terminal in response to pre-request information provided by the terminal device through the take-out pre-request screen;
   determining whether or not the specified information is stored, in a storage unit, in association with the received identification information on the terminal device that has sent the acquisition request, the storage unit storing the specified information to be generated in response to reception of a take-out operation of the data in association with the identification information on the terminal device for which a data acquisition is permitted for the data; and
   transmitting information that permits decryption of the encrypted data corresponding to the data to the terminal device when the specified information is stored in the storage unit in association with the received identification information.

2. The non-transitory computer-readable storage medium according to claim 1,
   wherein the specified information generated is different depending on the time when the acquisition request is received.

3. The non-transitory computer-readable storage medium according to claim 1, wherein
   the acquisition request is an instruction operation for storing specific data stored in a storage device that stores the encrypted data corresponding to the specific data in another storage device, or an instruction operation for transmitting the specific data to another information processing device.

4. The non-transitory computer-readable storage medium according to claim 1, wherein the process comprises:
   transmitting information that rejects decryption of the encrypted data to the terminal device when the specified information is not stored in the storage unit in association with the received identification information.

5. The non-transitory computer-readable storage medium according to claim 1, wherein
   a process of generating the specified information is performed every time the acquisition request is performed on the terminal device.

6. The non-transitory computer-readable storage medium according to claim 1, wherein
   when an acquisition request for a plurality of data is performed on the terminal device that encrypts the plurality of data collectively, a process of generating one piece of specified information in response to reception of the acquisition request for the plurality of data is performed.

7. The non-transitory computer-readable storage medium according to claim 1, wherein
   the plurality of alphanumeric values are randomly extracted.

8. An information processing device comprising:
   a memory; and a processor coupled to the memory and the processor configured to:
  receive a uniform resource locator (URL) of a management terminal from a terminal device;
  transmit, to the terminal device, a take-out pre-request screen specifying the URL;
  receive specified information generated in response to reception of an acquisition request of data from the terminal device that decrypts an encrypted data corresponding to the data, and identification information on the terminal device, the specified information including a plurality of alphanumeric values that differ for each of an operation date and time of the data, the acquisition request of the data from the terminal device being received after a pre-request permission for the data is sent to the terminal device, the pre-request permission being granted by the management terminal in response to pre-request information provided by the terminal device through the take-out pre-request screen;
  determine whether or not the specified information is stored, in a storage unit, in association with the received identification information on the terminal device that has sent the acquisition request, the storage unit storing the specified information to be generated in response to reception of a take-out operation of the data in association with the identification information on the terminal device for which a data acquisition is permitted for the data; and
  transmit information that permits decryption of the encrypted data corresponding to the data to the terminal device when the specified information is stored in the storage unit in association with the received identification information.

9. A non-transitory computer-readable storage medium storing a decryption program that causes a computer to execute a process, the process comprising:
  receiving a take-out pre-request screen specifying a uniform resource locator of a server;
  transmitting, to the server, specified information generated in response to an acquisition request of data and an identification information on a terminal device, the specified information including a plurality of alphanumeric values that differ for each of an operation date and time of the data, the acquisition request of the data occurring after a pre-request permission for the data is received from the server, the pre-request permission being granted by the server in response to pre-request information provided through the take-out pre-request screen; and
  decrypting encrypted data corresponding to the data upon receiving information, transmitted from the server, indicating that decryption of the encrypted data is permitted.

* * * * *